2,881,147

ACRYLONITRILE POLYMER COMPOSITION CONTAINING CYANOETHYL TETRAMETHYL DIAMIDO PHOSPHATE

Paul R. Graham, Richmond Heights, Mo., assignor to Monsanto Chemical Company, St. Louis, Mo., a corporation of Delaware No Drawing. Application October 15, 1956
Serial No. 615,740

5 Claims. (Cl. 260—30.6)

This invention relates to new and useful acrylonitrile polymer compositions and to flame-proof plasticized shaped articles obtained therefrom. More particularly this invention relates to compositions comprising an acrylonitrile polymer and a flame-proofing amount of 2-cyanoethyl tetramethyl diamido phosphate which has the formula

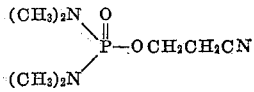

2-cyanoethyl tetramethyl diamido phosphate is a new compound and may be prepared as follows:

To a suitable reaction vessel equipped with a stirrer, reflux condenser and thermometer is charged approximately 68.24 parts by weight (substantially 0.4 mole) of tetramethyl diamido monochlor phosphate,

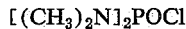

approximately 29.20 parts by weight (substantially 0.41 mole) of 2-cyanoethanol and approximately 60.70 parts by weight of triethyl amine. The mass is heated slowly to 75° C. and then is heated at 75° C. to 85° C. over a period of about 2.5 hours with constant agitation. To the so heated mass is added and intimately mixed approximately 20 parts by weight of triethyl amine and the mass heated at about 85° C. for approximately 3.5 hours. The mass is cooled and filtered and the salt cake residue washed with two successive 54 parts by weight portions of anhydrous diethyl ether. The respective washings and original filtrate are combined and admixed with approximately 521 parts by weight of chloroform. The mixture so obtained is then washed successively with approximately 100 parts by weight of a 5% aqueous sodium carbonate solution and with approximately 75 parts by weight of water and the washings discarded. The organic residue is subjected to vacuum distillation to remove the solvents (105° C./10 mm.) leaving approximately 77.5 parts by weight of a reddish colored oil identified as 2-cyanoethyl tetramethyl diamido phosphate, which product is soluble in acetone, benzene, chloroform, ethyl alcohol, and ethyl acetate.

Although acrylonitrile polymers provide shaped articles having many desirable physical and chemical properties, the finished products require a dressing or coating to render them flame-proof. In accordance with this invention it has been found that by admixing 2-cyanoethyl tetramethyl diamido phosphate with an acrylonitrile polymer a flame-proof article is produced, which in addition exhibits improved flexibility.

The 2-cyanoethyl tetramethyl diamido phosphate may be admixed with the acrylonitrile by a wide variety of mechanical procedures. Thusly, the polymer in granular form may be mixed physically with 2-cyanoethyl tetramethyl diamido phosphate or in aqueous or organic solutions or dispersions of 2-cyanoethyl tetramethyl diamido phosphate. It is preferred, however, to use any of the well known organic solvents for the acrylonitrile polymers in the presence of which the intimate dispersing of 2-cyanoethyl tetramethyl diamido phosphate and the acrylonitrile polymer is more readily effected. The nature of the solvent, which is useful in dissolving or softening the acrylonitrile polymer, will to a large extent depend upon the composition of the acrylonitrile polymers and its chemical reactivity with respect to 2-cyanoethyl tetramethyl diamido phosphate. Any of the well known solvents or plasticizers for acrylonitrile polymers may be employed provided such is chemically inert with respect to 2-cyanoethyl tetramethyl diamido phosphate. Of these well known solvents N,N-dimethyl formamide is preferred, however, and it is to be understood the instant invention is not so limited in that such solvents as N,N-dimethyl acetamide, ethyl carbonate, α-cyanoacetamide, etc., are also operable. Employing conventional techniques, such solutions or dispersions upon extruding, casting, etc., into a medium which removes the solvent from the solution yields a precipitate containing a homogeneous mixture of the acrylonitrile polymer and 2-cyanoethyl tetramethyl diamido phosphate, which precipitate is characterized by excellent chemical and physical properties, particularly with respect to flame-proof properties and flexibility.

The acrylonitrile polymers which are rendered flame-proof in accordance with this invention are polyacrylonitrile, copolymers of acrylonitrile with minor proportions of other monoolefinic ompounds polymerizable therewith, and mixtures of acrylonitrile polymers with other polymeric compositions, including olefinic polymers, or other types of polymeric substances. These mixtures, or blended polymeric compositions, are especially useful for the purpose of developing dye-receptive polymers, for example by blending non-dyeable acrylonitrile polymers with a minor proportion of a polymer chemically reactive with dyestuff. In general, there is a minimum proportion of acrylonitrile which should be present in polymeric form in order to have adequate tensile properties in the fibers prepared therefrom. Thus, a polymer of a monomeric mixture of which acrylonitrile is at least 70 percent of the polymerizable content is useful in the practice of this invention. Acrylonitrile polymers other than polyacrylonitrile which are rendered flame-proof in accordance with this invention are the copolymers of 80 or more percent of acrylonitrile and one or more of other monoolefinic monomers, e.g. vinyl acetate and other vinyl esters of monocarboxylic acids, vinylidene chloride, vinyl chloride and other vinyl halides, dimethyl fumarate and other dialkyl esters of fumaric acid, dimethyl maleate and other dialkyl esters of maleic acid, methyl acrylate and other alkyl esters of acrylic acid, styrene and other vinyl substituted aromatic hydrocarbons, methyl methacrylate and other alkyl esters of methacrylic acid, methacrylonitrile, vinyl pyridines such as α-vinyl pyridine and other vinyl substituted heterocyclic-nitrogen ring compounds, the alkyl substituted vinyl pyridines, vinyl chloroacetate, allyl chloroacetate, methallyl chloroacetate, allyl glycidyl ether, methallyl glycidyl ether, allyl glycidyl phthalate and the corresponding esters of other aliphatic and aromatic dicarboxylic acids, glycidyl acrylate, glycidyl methacrylate, and other mono-olefinic monomers copolymerizable with acrylonitrile.

In the practice of this invention the physical properties of the acrylonitrile polymers are of substantial importance. It is desirable that the polymers be uniform with respect to molecular weight, particle size, and chemical composition. In general, the molecular weight should be in excess of 10,000 and preferably in excess of 25,000, the molecular weights being determined by measuring the viscosity of dilute solutions in the manner well known in the art. Generally, those polymers having a molecular weight between 40,000 and 250,000 are preferred.

In the preferred practice of this invention acrylonitrile polymer solutions are prepared by dispersing finely divided polymers and 2-cyanoethyl tetramethyl diamido phosphate in an inert organic solvent followed by heating with stirring, tumbling or other agitation until a free-flowing homogeneous solution or dispersion is obtained. It is desirable to use a solution of dispersion of as high a concentration as possible of acrylonitrile polymer, but the maximum concentration will be dependent upon the molecular weight of the polymer and the viscosity characteristics of the mixture. To obtain fibers or films of optimum physical properties, acrylonitrile polymers of molecular weights in excess of 25,000 are used. While as little as 5% of the polymer can be used in a spinning or casting solution, such low concentrations are undesirable because they necessitate the removal of too much solvent from the extruded solution thereby increasing solvent recovery cost. The concentration of polymer in the spinning or casting solution is usually between 8 and 35%, but concentrations above 35% are also contemplated. The concentration of the polymer will ultimately be determined by considering the desired physical properties of the fiber or film. The viscosity will depend upon the chemical composition and molecular weight of the polymer, and the optimum concentration can best be determined by selecting a uniform high molecular weight polymer having good fiber-forming or film-forming properties and having as little an amount of solvent as possible to form a viscous solution capable of being spun or cast at convenient temperatures to provide a flame-proof finished fiber or film. Generally, the amount of 2-cyanoethyl tetramethyl diamido phosphate required to provide a flame-proof finished product will be in the range of 2 to 20% by weight based on the polymer. When a more flexible finished product is desired, amounts up to 35% by weight based on the polymer may be employed. It is not understood whether a chemical reaction is involved between 2-cyanoethyl tetramethyl diamido phosphate and the acrylonitrile polymer, or whether the presence of the said phosphate effects a reorientation of the acrylonitrile polymer. In this regard it is to be understood that the instant invention is not limited to any physical or chemical change, but solely to that flame-proof product obtained by admixing the said phosphate with an acrylonitrile polymer and heating said composition under conditions which ultimately provide for a flame-proof shaped article.

As illustrative of this invention is the following example:

*Example I*

10 parts by weight of a copolymer of 95 percent acrylonitrile and 5 percent of vinyl acetate and 1 part by weight of 2-cyanoethyl tetramethyl diamido phosphate are dispersed in 50 parts by weight of N,N-dimethyl formamide. The mixture is then heated to 160° C. at which temperature a homogeneous transparent solution is formed. Upon cooling the solution to room temperature, the solution maintained an element of homogeneity. Fibers are formed by spinning in contact with water, while films are prepared by pouring the solution on a smooth surface and washing the surface with water. In both instances the fibers and films so produced when exposed to a flame did not burn and exhibited good flexibility.

In contrast, by carrying out the procedure of Example I but omitting 2-cyanoethyl tetramethyl diamido phosphate, the films and fibers burn and are characterized by brittleness.

A particularly useful acrylonitrile polymer rendered flame-proof in accordance with this invention is a copolymer of 90 to 98% acrylonitrile and 2 to 10% of a vinyl pyridine, such as α-vinyl pyridine. As illustrative of such an embodiment of this invention is the following:

*Example II*

10 parts by weight of a copolymer of 95 percent acrylonitrile and 5 percent of α-vinyl pyridine and 1 part by weight of 2-cyanoethyl tetramethyl diamido phosphate are dispersed in 50 parts by weight of N,N-dimethyl formamide. The mixture is then heated to 160° C. at which temperature a homogeneous transparent solution is formed. Upon cooling the solution to room temperature, the solution maintained an element of homogeneity. Fibers are formed by spinning in contact with water, while films are prepared by pouring the solution on a smooth surface and washing the surface with water. In both instances the fibers and films so produced when exposed to a flame did not burn and exhibited good flexibility.

As further illustrative of this invention is the following:

*Example III*

10 parts by weight of an acrylonitrile homopolymer and 1 part by weight of 2-cyanoethyl tetramethyl diamido phosphate are dispersed in 50 parts by weight of N,N-dimethyl formamide. The mixture is then heated to 160° C. at which temperature a homogeneous transparent solution is formed. Upon cooling the solution to room temperature, the solution maintained an element of homogeneity. Fibers are formed by spinning in contact with water, while films are prepared by pouring the solution on a smooth surface and washing the surface with water. In both instances the fibers and films so produced when exposed to a flame did not burn and exhibited good flexibility.

While this invention has been described with respect to certain embodiments it is to be understood that it is not so limited and that variations and modifications thereof obvious to those skilled in the art may be made without departing from the spirit or scope of this invention.

What is claimed is:

1. A new composition of matter comprising a homogeneous miscible mixture of (1) a polymerization product containing in the polymer molecules an average of at least 70% by weight of acrylonitrile and up to 30% by weight of another monoolefinic monomer polymerizable therewith and (2) from about 2% to about 35% by weight, based on the weight of the polymerization product, of 2-cyanoethyl tetramethyl diamido phosphate.

2. The composition in accordance with claim 1, wherein the polymer is an acrylonitrile homopolymer.

3. The composition defined by claim 1, wherein the polymer is a copolymer of 95 percent acrylonitrile and 5 percent vinyl acetate.

4. The composition defined by claim 1, wherein the polymer is a copolymer of 90 to 98 percent acrylonitrile and from 2 to 10 percent of α-vinyl pyridine.

5. A new composition of matter comprising a homogeneous mixture of (1) a polymer blend containing at least 70% by weight of polyacrylonitrile and up to 30% by weight of a dye-receptive polymer of mono-olefinic monomer and (2) from about 2% to about 35% by weight based on the weight of the polymer blend of 2-cyanoethyl tetramethyl diamido phosphate.

References Cited in the file of this patent

UNITED STATES PATENTS 2,719,140     Slocombe et al. _____ Sept. 27, 1955